Oct. 22, 1929.  H. R. CRANE  1,732,447
SUN SHIELD FOR MOTOR VEHICLES
Filed March 14, 1929
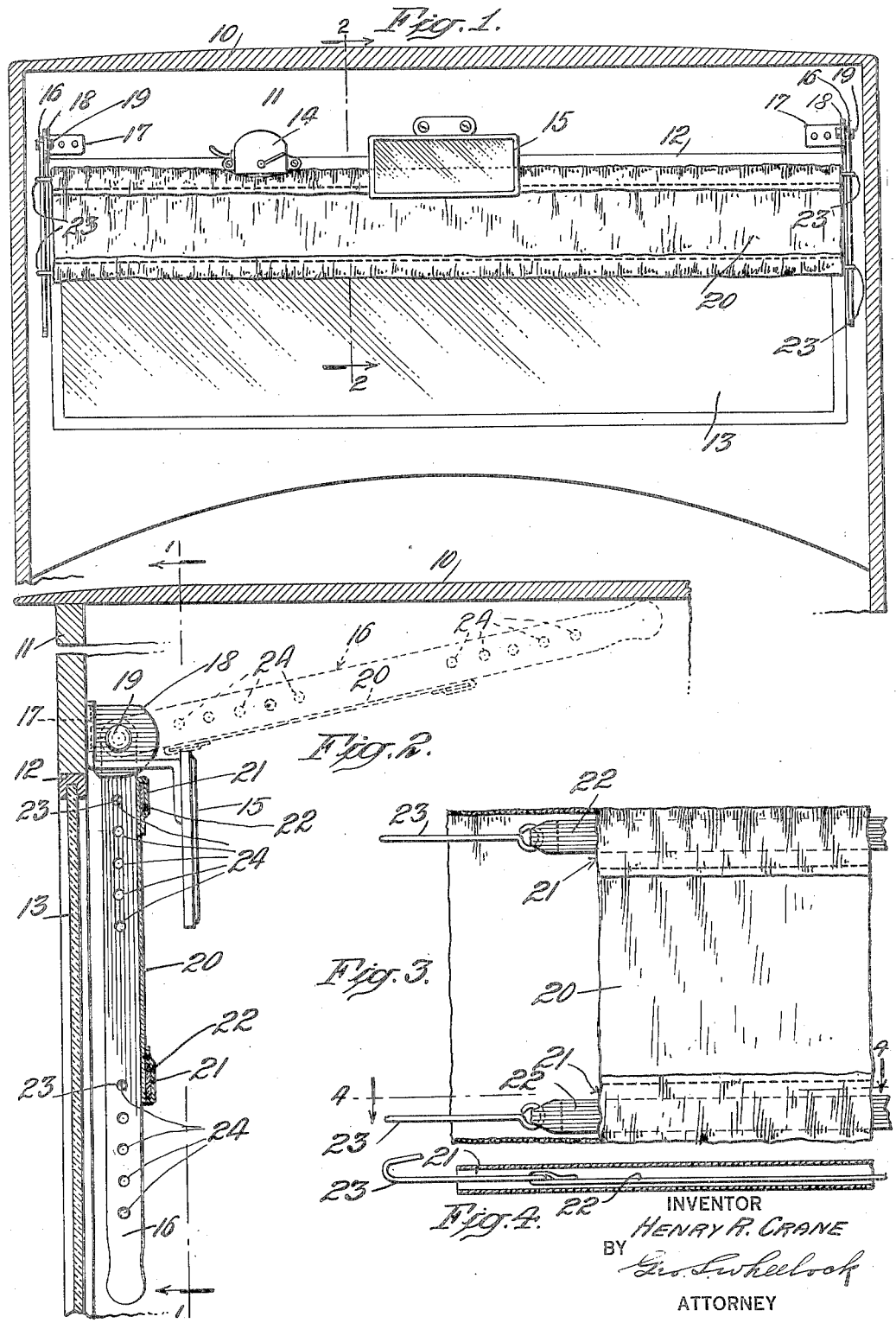
INVENTOR
HENRY R. CRANE
BY
Geo. S. Wheelock
ATTORNEY Patented Oct. 22, 1929

1,732,447

UNITED STATES PATENT OFFICE

HENRY R. CRANE, OF NEW YORK, N. Y.

SUN SHIELD FOR MOTOR VEHICLES

Application filed March 14, 1929. Serial No. 346,893.

The present invention relates to sun shields which are located in front of the driver of a motor vehicle, so as to protect the driver against the glare and rays of the sun when it is down towards the horizon. Heretofore sun shields for this purpose have been designed, and when suitable for the purpose they have been made complicated and rather expensive, and are not suited for adaptation in connection with various makes of cars, as the varying proportions of the car body in front of the sun shield, and the different constructions and locations of the rear view mirror and the motor box for the windshield wiper, do not permit of a universal sun shield, that is one which will accommodate itself to the varying conditions of construction of the said parts.

One of the objects of the present invention is to provide a simple and efficient sun shield for motor vehicles, wherein the sun shield proper is readily adapted to the varying conditions in the various makes of cars. In this connection it may be stated that the invention comprehends a pair of swingable arms which may be readily mounted at desired points on the car body, and whereon the sun shield proper is wholly supported, so that when the arms are moved, the whole sun shield proper is moved according to the adjusted position of the arms, there being no mechanical connection between the arms except the sun shield proper, unless the free ends of the arms may be connected together by a handle bar, so that the sun shield proper may be readily adjustable to the varying conditions in various makes of cars.

Another object of the invention is to provide a simple construction of sun shield for motor vehicles, in which the sun shield proper, wholly supported by the swingable arms, may be bodily adjusted lengthwise of the arms, that is transversely of itself; and wherein the arms may be set at the desired distance apart according to the varying widths of cars, the sun shield proper automatically accommodating itself to such varying widths, so that the sun shield proper has a double bodily adjustment, that is transversely of itself and also lengthwise, thereby enabling the sun shield to be made very economically and to serve with great efficiency.

These being among the objects of the present invention, the same consists of certain features of construction and combinations of parts to be hereinafter described and then claimed with reference to the accompanying drawings illustrating a preferred embodiment of the invention, in which:

Figure 1 is a transverse section on the line 1—1, Fig. 2, of the forward end of a car body having a wind shield back of which the improved sun shield is shown in elevation;

Fig. 2 is an enlarged transverse section on the line 2—2, Fig. 1;

Fig. 3 is an elevation showing a broken away portion of the sun shield proper; and Fig. 4 is a section on the line 4—4, Fig. 3.

Referring to the drawings, the top 10 of the car body has a front portion 11, which is provided with a windshield comprising a frame 12 and a transparent pane 13. Windshields are usually provided with wipers having a motor box 14 which is fixed at the top of the windshield, and in various cars, these boxes more or less project or hang downwardly above the top of the windshield, and would thus interfere more or less with sun shields, unless properly constructed as intended by the present invention. Also supported at the front of the car above the windshield is a rear view mirror 15 which usually extends down or protrudes over the top of the windshield, so that it affords an obstruction to the use of various sun shields, but not to those of the present invention. Just how the present invention overcomes these difficulties, will be explained later on.

The present invention includes a pair of arms 16, each of the arms being pivoted at its inner end to a bracket 17 having an ear or lug 18 through which a pivot 19 passes to connect the inner end of the arm with the bracket. The pair of brackets 17 is fixed to the front supporting portion 11 which extends above the windshield and they are so arranged as to locate one of the swingable arms 16 just beyond each end of the windshield. The brackets are so mounted as to place the pivots 19 in alignment with each other, whereby the arms are horizontally pivoted upon the supporting portion 11, and laterally of each other, for a downward, forward, movement and an upward, rearward, movement relatively to the windshield. Preferably the arms 16 are not rigidly connected together, unless the free ends of the arms are, as they may be, connected by a bar or handle portion. It is preferred, however, that they be disconnected, except by the sun shield proper 20. It will be seen therefore that the distance between the arms may be varied according to varying widths of car bodies to which the sun shield is to be applied. It will be noted from Fig. 2 that preferably each ear 18 of bracket 17 is of substantial size so as to provide considerable friction area between the ear and the adjacent inner end of the arm 16 which rubs against it, so that the arms will thereby be held to the adjusted position to which they may be swung.

The sun shield proper 20 consists of a narrow strip of suitable fine mesh and thin fabric which is preferably colored green. As this strip is composed of non-self-supporting material and is wholly supported upon the arms 16, suitable means are provided for so supporting the strip. The strip 20 is of a length sufficient to extend transversely of the car body for the full length of the windshield, and it is provided at the edges with longitudinal pockets 21. These pockets receive a pair of elastic or resilient bands or longitudinal connecting members 22, the ends of each band being provided with hooks 23. The pair of bands 22 is preferably shorter than the length of the strip 20 when it is stretched out, such strip being gathered together or puckered transversely so as to shorten it and to enable the length of the gathered up sun shield proper 20 to approximate the length of the bands 22, and to enable the hooks 23 to extend just beyond the ends of the sun shield proper, as shown in Fig. 1. The hooks 23 are adapted to be engaged in holes or perforations 24 in the swingable arms 16, there being two series of such holes extending longitudinally of each arm. The holes in one arm substantially coincide with the holes in the other arm when the arms are mounted in position, and these holes enable the two pair of hooks at the ends of the sun shield proper to be engaged at different positions away from the pivots 19, so as to adjust the sun shield proper transversely of itself. This transverse adjustment, while at the same time the sun shield proper is wholly and bodily supported upon the arms 16, enables the improved sun shield to be applied to the car under the varying proportions and conditions which prevail in one car as compared with another. This transverse adjustment of the sun shield proper also enables the upper edge of the same to be set in position so as to substantially coincide with the upper part of the frame 12 of the windshield. Preferably the bands or elastic connecting members 22 are loose and not directly attached to the material of the sun shield proper, the size of the pockets 21 being preferably considerably greater than the transverse dimensions of the bands. This enables the bands to be adjusted readily lengthwise of themselves, without interfering with fabric material of the sun shield proper 20, so that after the hooks of the bands have been connected with the swinging arms 16, the material of the sun shield proper may be gathered or puckered neatly transversely of itself, and the length of the sun shield proper and the bands may thus closely approximate the distance between the arms, thereby enabling the sun shield proper to cover the entire length of the upper part of the windshield.

It will be seen that the increased friction provided between the ends of the arms 16 and the bracket-ears 18, is augmented or supplemented by the tension of the bands 21 upon the arms 16, such tension acting to pull the arms firmly against the ears 18. The tension of the bands 22, thus augmenting the friction at the ears 18, thereby greatly assists in supporting the arms in any position in which they may be swung.

In use the improved sun shield presents a number of advantages, among them the following: The sun shield proper being wholly supported upon the swingable arms 16, and there being no metallic or other unyielding connections between the inner ends of the arms, it will be noted from Fig. 1 that when the sun shield is swung down into using position (also shown in full lines in Fig. 2), it is a simple matter to move the upper part of the narrow sun shield proper from in front of the rear view mirror 15 and to engage it behind the mirror, the yieldability of the sun shield proper permitting this movement. Thereby the utility of the rear view mirror is preserved as it is not interfered with by any part of the sun shield proper. Furthermore, the upper edge of the sun shield proper may be readily moved underneath the said box so as to present a neat appearance longitudinally of the windshield, and so as not to interfere with any mechanism in the box. When the sun shield is to be moved from the position shown in full lines in Fig. 2 to the position shown in broken lines, up against the top 10 of the car, it is a very simple matter to disengage the upper portion of the sun shield proper from beneath the box 14 and from behind the mirror 15, because of the yieldability of the sun shield proper, so that it may be swung upwardly out of use without interference by the box 14 or the mirror 15 or any other part which may project adjacent the upper edge of the sun shield proper. Frequently, the rear view mirror would, as shown in Fig. 2, interfere with the easy movement of the sun shield to the position shown in broken lines if it were not for the yielding nature of the top edge of the shield and the band thereat. Therefore, in such cases, the top edge and band may be held back from the mirror by one hand, and when the shield has reached the upper position, the top edge and band may be tucked or engaged over the top edge of the mirror, so as to leave the mirror clear of any obstruction that would interfere with rearward visibility. As the improved sun shield is of such simple construction as shown and described, consisting of relatively few parts, it will readily be understood that the installation of the sun shield in a car is a comparatively easy matter; also that when packed for sale or shipment the pair of arms with their brackets, being disconnected from the hooks 23, enables the sun shield proper to be rolled up in small compass and packed with the arms. It should be mentioned that preferably the elastic bands or the like are somewhat less than half the length of the narrow strip of fabric 20 when the latter is extended its full length and before the strip is gathered up transversely on the bands. This will permit the strip 20 to be gathered up more or less when in position, depending upon the length of the stretched bands, and as the bands are long enough to be adapted to the different car widths, by stretching the bands more or less, the strip of fabric being of a length much greater than the bands may be so gathered up that it extends across the whole length of the upper portion of the windshield.

It is obvious that the invention is susceptible to various modifications without departing from the scope of the appended claims.

What I claim as new, is:

1. An automobile sun shield comprising arms pivotally supported at their upper ends adjacent the upper portion of a wind shield to swing upward and downward within an automobile body, a rear view mirror positioned adjacent to a wind shield, a flexible sun shield material bodily supported wholly from the arms and having its upper edge positioned in relation to said rear view mirror at the front of the car that the flexibility of the material will permit it to be passed to the rear of the mirror and leave the mirror face unobscured when the arms are lowered and pass above the mirror and leave the mirror face unobscured when the arms are raised.

2. An automobile sun shield comprising arms pivotally suspended at their upper ends from the front of an automobile body, inside the car, so that the arms may swing upwardly and downwardly, a rear view mirror positioned adjacent to a wind shield, a flexible sun shield material extending from one arm to the other and supported from both arms and formed with a pocket disposed lengthwise of the width of the material, a resilient member positioned within said pocket, and fastening means at the ends of the resilient member for securing the sun shield material to the arms, the resilient member being freely movable within the pocket and the sun shield material being adapted to flex along the line of the pocket to permit the material to pass beneath or above said rear view mirror in the path of movement of the flexible sun shield material, when the arms are lowered and when raised.

3. An automobile sun shield comprising arms pivotally connected at their upper ends to brackets adapted to be attached to the front of an automobile body, inside the car, so that the arms may swing upwardly and downwardly at opposite ends of the windshield of the automobile, a rear view mirror positioned adjacent to a wind shield, a flexible material extended between the arms and provided with resilient members loosely connected with said material and having fastenings for detachably securing the ends of the flexible material to the swinging arms and permitting vertical adjustment of the flexible material relatively to the swinging arms, the flexible material being yieldable along its upper line to permit it to pass beneath and to the rear of said rear view mirror when the arms are lowered and above the top of the mirror when the arms are raised.

4. An automobile sun shield comprising arms frictionally supported at their upper ends from supports connected to the front of an automobile body to swing upwardly and downwardly inside the automobile body beyond the ends of a windshield, the frictional supporting of said arms permitting them to be sustained at different positions of adjustment, a rear view mirror positioned adjacent to a wind shield, and a flexible material extending between the arms and connected by means at its upper and lower ends to the arms to maintain the material distended between the arms and having its upper edge yieldable to permit it to pass beneath and to the rear of said rear view mirror positioned inside the car body, above the windshield, when the arms are lowered and pass above and to the rear of said mirror when the arms are swung upward.

HENRY R. CRANE.